United States Patent
Cao

(10) Patent No.: US 9,216,833 B2
(45) Date of Patent: Dec. 22, 2015

(54) HANGING PARALLEL-PUSH TYPE QUEUING DEVICE FOR PACKAGING BY TUBULAR MATERIAL

(75) Inventor: Weilong Cao, Shanghai (CN)

(73) Assignee: SHANGHAI HONGQU ELECTRONIC TECHNOLOGY CO., LTD., Shanghai (CN)

( * ) Notice: Subject to any disclaimer, the term of this patent is extended or adjusted under 35 U.S.C. 154(b) by 448 days.

(21) Appl. No.: 13/882,186

(22) PCT Filed: Mar. 2, 2012

(86) PCT No.: PCT/CN2012/071890
§ 371 (c)(1),
(2), (4) Date: Jun. 14, 2013

(87) PCT Pub. No.: WO2013/049978
PCT Pub. Date: Apr. 11, 2013

(65) Prior Publication Data
US 2013/0255185 A1 Oct. 3, 2013

(30) Foreign Application Priority Data
Oct. 2, 2011 (CN) .......................... 2011 1 0296532

(51) Int. Cl.
*B65B 35/04* (2006.01)
*B65B 35/20* (2006.01)
*B65B 35/30* (2006.01)
B65G 47/08 (2006.01)
B65G 47/84 (2006.01)

(52) U.S. Cl.
CPC .................. *B65B 35/30* (2013.01); *B65B 35/04* (2013.01); *B65B 35/20* (2013.01); *B65G 47/082* (2013.01); *B65G 47/841* (2013.01)

(58) Field of Classification Search
CPC .......... B65B 35/04; B65B 35/20; B65B 35/30
USPC ............................................. 53/235
See application file for complete search history.

*Primary Examiner* — Andrew M Tecco
*Assistant Examiner* — Praachi M Pathak
(74) *Attorney, Agent, or Firm* — Kening Li; Miller Canfield

(57) ABSTRACT

A hanging and parallel pushing lining-up device for a tubular material package which is a automatic packaging machine used for the pillow-type tubular material, comprises a hang-rail (10), a front propeller (40), a queuing means (20), a back propeller (42), a hang-rail (30) prepared for packaging, a hang-rail (21) for queuing and a hang-rail (33) for storage and waiting; a queuing means (20), comprising the hang-rail (21) for queuing and a movement synchronization module (24), the inlet section (22) of the hang-rail for queuing connects to the hang-rail (30) for storage and waiting, the outlet section (23) of the hang-rail for queuing connects to the exit end of the hang-rail (33) for storage and waiting; the front propeller (40) and the back propeller (42) both have a controlled pushing forward head (41, 43) which is able to extend out or shrink back horizontally. The hang-rail for storage and waiting comprises parallel hails, each width of which is the same as the length of the baffle grid (29). The whole width of rails at the inlet end of the hang-rail for storage and waiting is the same as the length of the outlet section. The number of rails is the same as that of the baffle grids of the outlet section.

5 Claims, 4 Drawing Sheets

HANGING PARALLEL-PUSH TYPE QUEUING DEVICE FOR PACKAGING BY TUBULAR MATERIAL

FIELD OF THE INVENTION

The invention concerns a pillow-type packaging machine, especially a hanging and parallel pushing lining-up device for a tubular material package.

BACKGROUND

The present pillow-type packaging is to vertically seal up the slices of the packaging materials from the left and right into a complete cavity, while the objects to be packaged are set inside, and then the cavity is cut off and sealed from two ends of the objects, thus resulting in a pillow-like package, which accounts for the name. The whole packaging procedure is highly automatic with a quick pace, applicable for massive, granular, powdery, and liquid objects, as for food like biscuits, yolk pie, chocolate, bread, fast noodles, moon cake, soya-bean milk, milk, soybean sauce, cooking wine, lotus root starch and etc.; and also applicable for the packaging for various commodities, industrial components and medical mechanics. There emerge many specialized techniques and patents on the pillow-type packaging machine.

It is quite a satisfactory form of pillow packaging, during which the slices of materials are sealed up into a cavity meanwhile the object to be packaged are set into the cavity. However, it also comes in with the following disadvantages: 1. A big consumption of packaging materials. The present packaging is completed by stitching up the slices of packaging materials from the left and right, which results in a big consumption of the packaging materials in the stitching part. 2. A bad outlook. The stitches are left outside the completed package. 3. Multi-layer composite material is demanded for packaging materials, leading to a high cost. 4. Compared to tube type packaging, pillow type packaging has one more process, leading to a higher cost and waste of the energy.

Compared with the mentioned packaging techniques based on slices of materials, tube type packaging involves no stitching and no multi-layer composite material, which results in a low cost, a good outlook, better energy efficiency and inexpensiveness.

However, compared to the packaging with slices of materials, packaging with tubular materials has big difference in the procedures during which objects to be packaged are fed.

1. For packaging with slices of materials, it is to place the objects to be packaged into the slices of materials for packaging. No open ends are involved. But for packaging with tubular materials, it can only feed the objects to be packaged into the packaging materials through the open ends, therefore a high accuracy is required with the feeder.

2. For packaging with slices of materials, the feeding can be implemented horizontally or vertically, with no requirement of the height of the feeding position; when objects to be packaged can only enter through the open end vertically opened, it has a high demand of the height of the feeding position, increasing the complexity of the feeder.

3. Packaging with slices of materials allows high speed and multiple feeding with sealing and packaging at the same time, which fulfills the object of a high speed of packaging by only one packaging line. But for packaging with tubular materials, it is to turn a top end of a tube to be a packet for packaging first to enable the feeding and packaging. Respective steps of the procedure can only be conducted in circle instead of operating at the same time, therefore the speed required can only be supplemented by numbers, which is to say, multiple tubes of tubular materials are adopted to complete one step in order at the same time for packaging.

Multiple tubes of tubular materials adopted to complete one step in order at the same time means that multiple objects to be packaged are waiting in queue at respective feeding inlets and the speed of queuing fits the speed of packaging. As the case for instance of 5 objects to be packaged completing the same step of the procedure at the same time, if the target speed is to complete 3 objects per second, it is required that 5 objects to be packaged should be at 5 feeding inlets every 1.6 seconds.

For most kinds of products, they appear concentrated in one line while the feeding inlets are scattered with relatively wide space in between. Therefore, it is a problem to be solved that how to line up the objects to be packaged into multiple lines.

Chinese Patent "A prop-mouth apparatus for packaging bag of automatic packaging machine for dispensable injectors" (Application No.: 200820162608) and Chinese Patent "A material feeding apparatus for packaging bag of automatic packaging machine for dispensable injectors" (Application No.: 2008100634552) offer some solutions related to the topic, but no satisfactory solutions are offered on completing lining up and feeding the objects to be packaged.

SUMMARY

The goal of the invention is to offer a hanging and parallel pushing lining-up device for a tubular material package, which realizes the quick queuing of the objects to be packaged into lines, the number of which is the same as that of the lines at the feeding inlet.

The solution is as follows:

A hanging and parallel pushing lining-up device for a tubular material package, comprising a hang-rail, a front propeller, a queuing means, a back propeller, a hang-rail prepared for packaging, a hang-rail for queuing and a hang-rail for storage and waiting;

The hang-rail comprises two parallel hand-strips, the object to be packaged hangs between the hang-strips and move in the hang-rail one by one.

The queuing means comprises the hang-rail for queuing and a movement synchronization module. The hang-rail is in a shape of "U", and is above the movement synchronization module. One top end of "U" is the inlet section while the other top end is the outlet section.

The tail end of the hang-rail prepared for packaging, where the objects to be packaged are fed, is at the end of the hang-rail prepared for packaging, parallel to the inlet section and converges with the inlet section into a sharing hang-rail section. No hang-strips are set in the sharing hang-rail section. The length of the sharing hang-rail section is the same as that of the inlet section.

The movement synchronization module is a synchronized wheel module moving horizontally. A baffle is set on the synchronization belt vertically. Adjacent baffles conceive of a baffle grid and one single baffle grid can only hold one object to be packaged. When the baffle grid moves, the object to be packaged inside the baffle grid moves accordingly. The synchronization belt is driven by the driving wheel, turning round specified number of baffle grids. The whole length of specified baffle grids is the same as that of the inlet section.

The front propeller is on the outer side of the sharing hang-rail section. The pushing forward head of the front propeller is below the inlet section. When the synchronization belt is still, the pushing forward head is on the side to push the objects to be packaged on the sharing hang-rail section into the baffle grids of the synchronization belt at the inlet section and hang the objects to be packaged onto the hang-strips.

For example that the specified number is three, the pushing forward head of the front propeller horizontally push the three objects to be packaged into the three baffle grids of the synchronization belt of the inlet section, meanwhile, the three objects to be packaged are hung onto the hang-rail of the inlet section of the hang-rail for queuing. After the push is completed, the synchronization belt moves forward for three baffle grids and the front propeller pushes again three objects to be packaged into three back baffle grids. As the above procedure moves in circles, the synchronization belt before the propeller becomes full of the objects to be packaged which hang on the hang-rail for queuing.

The other top end of the "U" shape of the hang-rail for queuing is outlet section. No hang-strips are set on the outer side of the outlet. The length and the number of baffle grids of the outlet is the same as that of the inlet section. On the inner side of the outlet section sets a back propeller. The back pushing forward head of the back propeller is below the outlet section. The back propeller and the front propeller push the same number of the objects to be packaged out of the outlet section and baffle grids at the same time.

The outlet section connects vertically to the inlet end of the hang-rail for storage and waiting. The hang-rail for storage and waiting comprises parallel hang-rails. The length of all hang-rails of the outlet end of the hang-rail for storage and waiting is the same as that of the outlet section. The number of the hang-rails is the same as that of baffle grids. The distance between hang-strips of each hang-rail is the same as the length of the baffle grid. Each hang-rail can only allow one single object to be packaged to get into.

For example: There are three objects to be packaged vertically arranged in three baffle grids of the synchronization belt. The three baffle grids correspond to the three starting ends of hang-rails of inlet ends of the hang-rail for storage and waiting. Because no hang-strips are set on the outer side of the outlet section, the back pushing forward head can push three objects to be packaged laterally at the same time into the three starting ends of hang-rails of inlet ends of the hang-rail for storage and waiting.

The inlet end of the hang-rail for storage and waiting is above the outlet end of the hang-rail for storage and waiting. The objects to be packaged, which enter into the hang-rails, will slide into respective ends of the hang-rails and accumulate backward from the end of the hang-rail. The longer the hang-rail is, more objects to be packaged can be stored for waiting. The length of the hang-rail relates to the expected number of the objects for storage and waiting.

If the ends of respective hang-rails are set beside respective feeding inlets, a line of objects to be packaged will remain by the respective feeding inlets.

The function of the front propeller is to push the specified number of objects to be packaged into queuing means at the same time.

The function of the queuing means is to line up the specified number of objects to be packaged into a line and move them into specified position.

The function of the back propeller is to push the specified number of objects to be packaged into hang-rail for storage and waiting.

The function of the hang-rail for storage and waiting is to line up the objects to be packaged into multiple lines with specified distance between.

The invention is implemented as follows:

A hanging and parallel pushing lining-up device for a tubular material package, comprising a hang-rail, a front propeller, a queuing means, a back propeller, a hang-rail prepared for packaging, a hang-rail for queuing and a hang-rail for storage and waiting;

wherein the hang-rail comprises the hang-rail prepared for packaging, the hang-rail for queuing and the hang-rail for storage and waiting, the hang-rail comprises two parallel adjacent hand-strips and has the same distance from the hang-strips, the hang-rail can only have one single object to be packaged get into, the object to be packaged hangs between the hang-strips and move in the hang-rail;

wherein the queuing means comprises the hang-rail for queuing and a movement synchronization module, the hang-rail for queuing has an inlet section and an outlet section; the movement synchronization module is a synchronized wheel module moving horizontally, comprising a synchronization belt, a driving wheel and a driven wheel; a baffle is set on the synchronization belt, and the baffle is set on the synchronization belt vertically, adjacent baffles conceive of baffle grids, one single baffle grid an only hold one object to be packaged, the driving wheel and the driven wheel are set at two ends of the inner side of the synchronization belt respectively, the driving wheel steers the driven wheel to move round, and the synchronization belt moves round specified number of baffle grids;

wherein the front propeller has a front pushing forward head driven to extend out or shrink back horizontally, the back propeller has a back pushing forward head has a back pushing forward head driven to extend out or shrink horizontally;

wherein the hang-rail for storage and waiting comprises parallel hang-rails and the length of the hang-rail relates to the expected number of objects to be packaged, which are waiting to be stored;

wherein the hang-rail for queuing is set above the movement synchronization module and the hang-rail is in the shape of "U", one top end of which is the inlet section while the other top end of which is the outlet section; the baffles of the movement synchronization module are set on the outer side of the synchronization belts, the baffle grids are set vertically below the space between two hang-strips of the hang-rail, and the number of baffle grids of the inlet section is the same as that of the baffle grids of the outlet section; no the hang-strips are set on the outer side of the inlet section and no the hang-strips are set on the outer side of the outlet section;

wherein the hang-rail prepared for packaging stays tilted, the tail end of the hang-rail prepared for packaging is at the bottom of the hang-rail prepared for packaging, parallel to the inlet section and converges with the inlet section as a sharing hang-rail section; the length of the sharing hang-rail section is the same as that of inlet section and no the hang-strips are set on the inner side of the hang-rail prepared for packaging of the sharing hang-rail section;

wherein the front propeller is on the outer side of the sharing hang-rail section, the length of the front pushing forward head is the same as that of the inlet section and the front pushing forward head is below the inlet section, the front propeller is on the side of the hang-rail and extends out the front pushing forward head;

wherein the inlet end of the hang-rail for storage and waiting connects vertically to the outlet section, the inlet end of the hang-rail for storage and waiting is above the outlet end of the hang-rail for storage and waiting, the width of one single rail of the hang-rail for storage and waiting is the same as the length of one single baffle grid, and the sum width of all rails of the inlet end of the hang-rail for storage and waiting is the same as the length of outlet section;

wherein the back propeller is on the inner side of the outlet section, the length of the back pushing forward head of the back propeller is the same as that of outlet section, the back pushing forward head is below the outlet section, the back propeller is on the side of the outlet section and extends out the back pushing forward head horizontally.

For the device, the distance between adjacent the baffles is the same as that between the hang-strips of hang-rail.

For the device, the synchronization belts each time turns round the same number of the baffle grids as that of the baffle grids where the inlet section locates, and the length of turning once is the same of the inlet section.

For the device, the hang-rail for storage and waiting is in the shape of horn and the whole width of the inlet end of the hang-rail for storage and waiting is smaller than that of the outlet end of the hang-rail for storage and waiting.

For the device, the hang-rail is tilted and the inlet end of the hang-rail for storage and waiting is above the outlet end of the hang-rail for storage and waiting.

The advantage of the invention is that the device can adjust to different speed with different demand of quantity of the packaging machine.

In figures, 10: hang-rail, 11: hang-strip, 12: object to be packaged, 13: feeding inlet, 20: queuing means, 21: hang-rail for queuing, 22: inlet section, 23: outlet section, 24: movement synchronization module 24, 25: synchronization belt, 26: driving wheel, 27: driven wheel, 28: baffle plate, 29 baffle grid, 30: hang-rail prepared for packaging, 31: tail end of the hang-rail prepared for packaging, 32: sharing hang-rail section, 33: hang-rail for storage and waiting, 34: inlet end of the hang-rail for storage and waiting, 35: outlet of the hang-rail for storage and waiting, 40: front propeller, 41: front pushing forward head, 42 back propeller, 43: back pushing forward head.

There are 3 rails for the hang-rail for storage and waiting of the embodiment in the figures. Modifications can be made to the number of the rails according to actual situations.

In order to make the description concise, the details of power and the impetus will be omitted in figures and contexts.

EMBODIMENTS CARRYING OUT THE INVENTION

Figure 1:
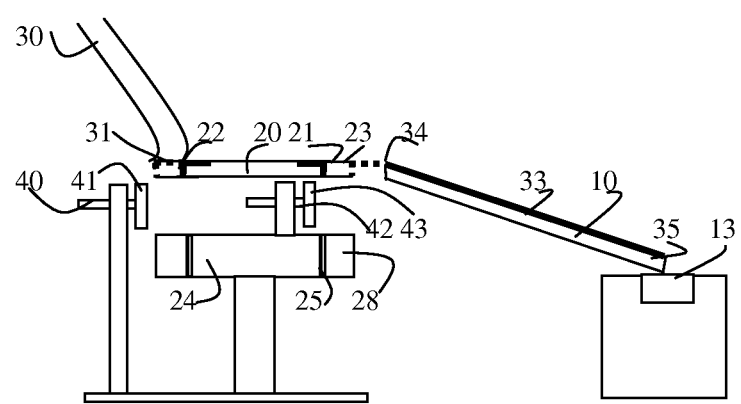
FIG. 1, FIG. 2 are the side views of the section of the embodiment.
Figure 2:
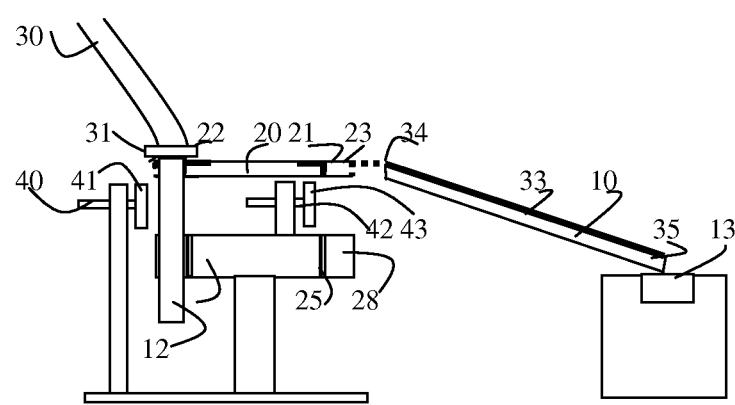

Referring to FIG. 1 and FIG. 2, FIG. 1 and FIG. 2 are the side views of the section of the embodiment. The difference between FIG. 1 and FIG. 2 is that there is an object 12 to be packaged.

Due to the side view, one hang-rail 10 illustrated as a figure of the hang-rail 33 for storage and waiting. The hang-rail 33 for storage and waiting is tilted. An outlet end 35 of the hang-rail 33 for storage and waiting stays below an inlet end 34 of the hang-rail 33 for storage and waiting. A feeding inlet 13 is under the outlet end 35 of the hang-rail 33 for storage and waiting.

A hang-rail 30 prepared for packaging is tilted, the tail end 31 of which is the lowest point. A hang-rail 30 prepared for packaging stays left to a queuing means 20. The hang-rail 33 for storage and waiting stays right to the queuing means 20.

The queuing means 20 comprises a hang-rail 21 for queuing and a movement synchronization module 24. The movement synchronization module 24 is below the hang-rail 21 for queuing. When the baffle plate 28 of the synchronization belt 25 moves, the object 12 to be packaged hanging on the hang-rail 21 for queuing is driven to move accordingly. The hang-rail 21 for queuing has an inlet section 22 and an outlet section 23. The inlet section 22 is on the left. The outlet section 23 is on the right. The synchronization belt 25 moves counter clockwise from the inlet section 22 to the outlet section 23.

The tail end 31 of the hang-rail prepared for packaging and the inlet section 22 converge parallel into one rail. The hang-rail 33 for storage and waiting connects to the outlet section 23 vertically.

A front propeller 40 is on the outer side of the hang-rail 30 prepared for packaging and the inlet section 22. The front pushing forward head 41 of the propeller 40 is below the inlet section 22. The front pushing forward head 41 of the propeller 40 is able to extend out in the direction of inlet section 22. The extended front pushing forward head 41 pushes the object 12 to be packaged hanging on the hang-rail 30 prepared for packaging into the inlet section 22.

A back propeller 42 is set on the inner side of the outlet section 23 and the inlet end 34 of the hang-rail for storage and waiting. The back pushing forward head 43 of the back propeller 42 is below the outlet section 23. The back pushing forward head 43 is able to extend in the direction of the inlet end 34 of the hang-rail for storage and waiting.

The front pushing forward head 41 and the back pushing forward head 43 can be either above the baffle plate 28 or below the baffle plate 28, the function of which is to push out multiple objects 12 to be packaged from sides of the hang-rail 10.

Figure 3:
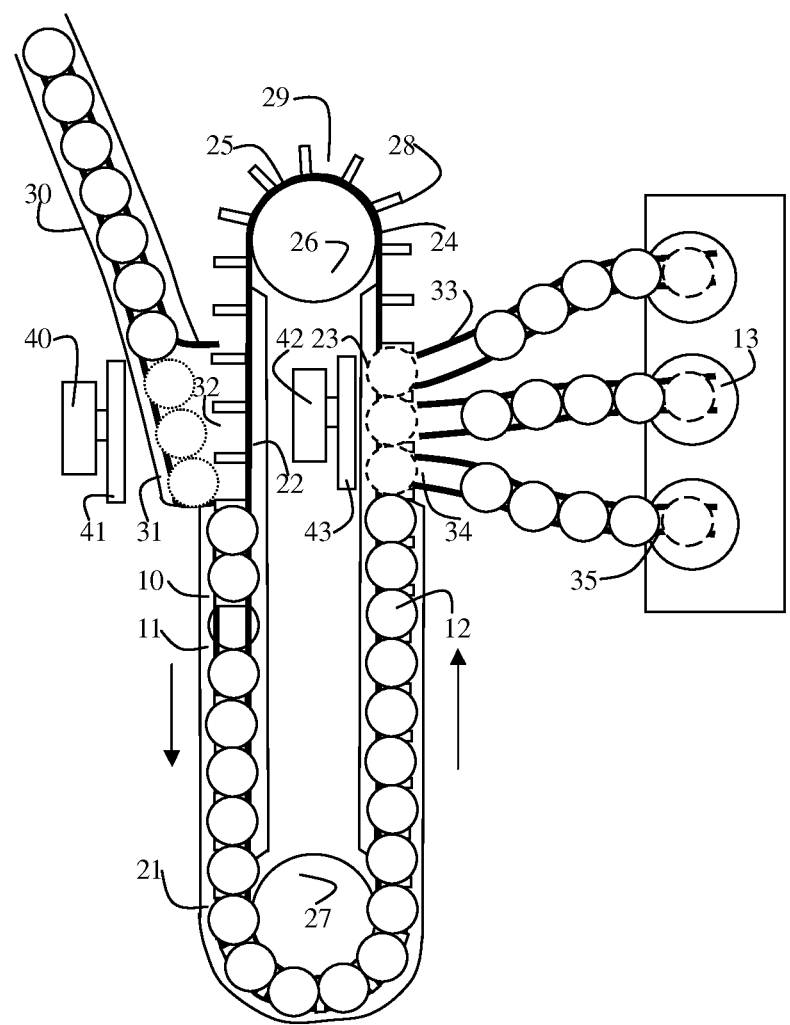
FIG. 3, FIG. 4 are the top views of the embodiment.
Figure 4:
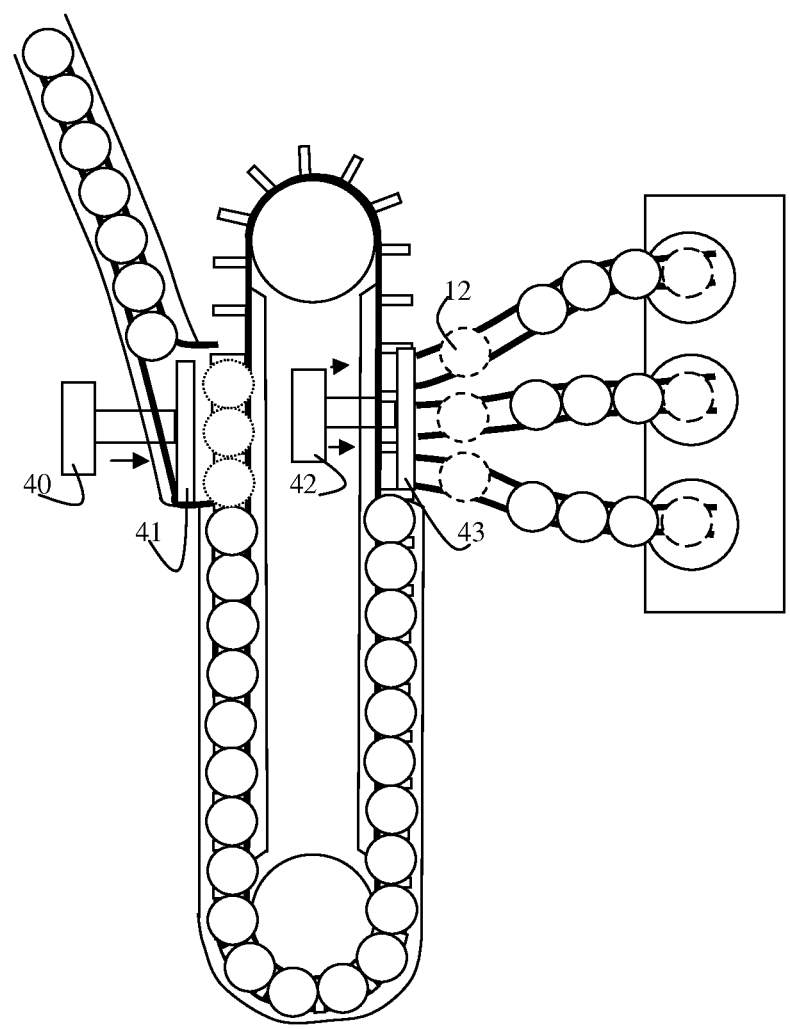

Referring to FIG. 3 and FIG. 4, FIG. 3 and FIG. 4 are the top views of the embodiment.

FIG. 3 shows the state of the apparatus after synchronization belt 25 moves. FIG. 4 shows the state of the apparatus after the front pushing forward head 41 and the back pushing forward head 43 extend out.

In figures: The hang-rail 10 comprises two parallel hang-strips 11, the distances between which are the same. The object 12 to be packaged hangs between two hang-strips 11. The object 12 to be packaged can move one by one in order between the hang-rail 10. The hang-rail 30 prepared for packaging, the hang-rail 21 for queuing, and the hang-rail 33 for storage and waiting also comprise two adjacent parallel hang-strips 11.

The hang-rail 21 for queuing stays as a shape of "U", the two top ends of which are the inlet section 22 and the outlet section 23 respectively.

The tail end 31 of the hang-rail prepared for packaging, which inputs the object 12 to be packaged, and the inlet section 22 of the hang-rail 21 for queuing converge into a sharing hang-rail section 32. No hang-strips 11 are set between the sharing hang-rail section 32. The length of the sharing hang-rail section 32 is the same as that of the inlet section 21.

The movement synchronization module 24 is a synchronized wheel module moving horizontally. The synchronization belt 25 moves counter clockwise from inlet section 22 to outlet section 23. The baffle plate 28 is set on the synchronization belt 25 vertically. The baffle plate 28 is set on the outer side of the synchronization belt 25. The adjacent baffle plates 28 conceive of a baffle grid 29. One baffle grid 29 is just enough to hold one object 12 to be packaged. When the baffle grid 29 moves, the object 12 to be packaged holding in the baffle grid 29 moves accordingly on the hang-rail 21 for queuing.

The synchronization belt 25 is driven by the driving wheel 26 and turn round specified number of baffle grids 20 once a time. The length of the turning is the same of that of the inlet section 22. As shown in the figure, at the tail end 31 of the hang-rail prepared for packaging are three objects 12 to be packaged illustrated in dotted lines, which means each turn turns round three baffle grids 29.

The front propeller 40 is set on the outer side of the tail end 31 of the hang-rail prepared for packaging. The width of the front pushing forward head 41 is the same as that of the three objects 12 to be packaged. Because the hang-rail 30 prepared for packaging is tilted and the tail end 31 of the hang-rail prepared for packaging is at the lowest point, the objects 12 to be packaged will inevitably accumulate backwards from the tail end 31 of the hang-rail prepared for packaging.

The front propeller 40 and the synchronization belt 25 start one after another. When the synchronization belt 25 stays still, the front pushing forward head 41 is on the side and extends out horizontally in the direction of the inlet section 22. The tail end 31 of the hang-rail prepared for packaging does not have hang-strip 11 on the inner side and the inlet section 22 does not have hang-strip 11 on the outer side, therefore the three objects 12 to be packaged at the tail end 31 of the hang-rail prepared for packaging are pushed into the baffle grids 29 of the synchronization belt 25 of the inlet section 22 and are hung onto the hang-strips 11 on the inner side of the inlet section 22.

The outlet section 23 connects to the inlet end 34 of the hang-rail for storage and waiting vertically. The hang-rail 33 for storage and waiting comprises three parallel hang-rails 10. The width of the whole hang-rails 10 at the inlet end 34 of the hang-rail for storage and waiting is the same as the length of the outlet section 23. Three inlets of the hang-rail 10 correspond to three baffle grids 29 of the outlet section 23. The distance between the hang-strips 11 of each hang-rail 10 is the same as the length of the baffle grid 29. Each hang-rail 10 can only hold one single object 12 to be packaged inside.

The back propeller 42 is on the inner side of the outlet section 23. The width of the back pushing forward head 43 is the same as that of three objects 12 to be packaged. The three objects 12 to be packaged at the outlet section 23 are arranged vertically in three baffle grids 29 of the synchronization belt 25. The three baffle grids 29 correspond to three inlets 34 of the hang-rail 10 on the hang-rail 10. Because the outlet section 23 does not have hard-strips 11 on the outer side, after the back pushing forward head 43 at the inner side of the outlet section 23 extends out horizontally to the inlet end 34 of the hang-rail for storage and waiting, three objects 12 to be packaged on the baffle grids 29 of the outlet section 23 will be pushed into three hang-rails 10 of the hang-rail 33 for storage and waiting.

The back pushing forward head 43 and the front pushing forward head 41 extend out and shrink back at the same time. The movement of the synchronization belt 25 and the shrink and extension of the back pushing forward head 43 and the front pushing forward head 41 proceed alternatively. When the synchronization belt 25 stays still, the back pushing forward head 43 and the front pushing forward head 41 begin to extend or shrink. When the synchronization belt 25 moves, the back pushing forward head 43 and the front pushing forward head 41 all stop extending or shrinking.

The objects 12 to be packaged, which have entered the hang-rail 33 for storage and waiting, will slide to the respective ends of hang-rails 10 and accumulate backward from the ends of the hang-rails 10. Longer the hang-rails 10 are, more objects can be hold for storage and waiting. The length of hang-rail 10 relates to the expected number of objects for storage and waiting.

If respective ends of hang-rails 10 are set besides respective feeding inlet 13, it ensures that a line of objects 12 to be packaged is set besides respectively feeding inlet 13.

What is claimed is:

1. A hanging and parallel pushing lining-up device for a tubular material package, comprising a first hang-rail (10), a front propeller (40), a queuing means (20), a back propeller (42), a second hang-rail (30) prepared for packaging, a third hang-rail (21) for queuing and a fourth hang-rail (33) for storage and waiting;

wherein said first hang-rail comprises said second hang-rail prepared for packaging, said third hang-rail for queuing and said fourth hang-rail for storage and waiting, said first hang-rail consists of two parallel adjacent hang-strips (11), and the distance between said hang-strips (11) is equal, said first hang-rail can only have one single object (12) to be packaged into, said object (12) to be packaged hangs between said hang-strips (11) and move in said first hang-rail; said object (12) to be packaged can move among said first hang-rail; wherein said fourth hang-rail (33) for storage and waiting comprises parallel first hang-rail and the length of said fourth hang-rail (33) corresponds to the number of objects (12) to be packaged, which are waiting to be stored;

wherein said queuing means (20) comprises said third hang-rail (21) for queuing and a movement synchronization module (24), said third hang-rail (21) for queuing has an inlet section (22) and an outlet section (23); said movement synchronization module (24) is a synchronized wheel module moving horizontally, comprising a synchronization belt (25), a driving wheel (26) and a driven wheel (27); a baffle plate (28) is set on the synchronization belt (25), and said baffle plate (28) is set on the synchronization belt (25) vertically, adjacent baffle plates (28) conceive of baffle grids (29), one single baffle grid (29) can only hold one object (12) to be packaged, said driving wheel (26) and said driven wheel (27) are set at two ends of the inner side of said synchronization belt (25) respectively, said driving wheel (26) steers said synchronization belt (25) to move round, and said synchronization belt (25) moves round specified number of baffle grids (29);

wherein said front propeller (40) has a front pushing forward head (41) driven to extend out or shrink back horizontally, said back propeller (42) has a back pushing forward head (43) driven to extend out or shrink horizontally;

wherein said third hang-rail (21) for queuing is set above said movement synchronization module (24) and said third hang-rail (21) for queuing is in the shape of "U", one top end of which is the inlet section (22) while the other top end of which is the outlet section (23); said baffle plates (28) of said movement synchronization module (24) are set on the outer side of said synchronization belts (25), said baffle grids (29) are set vertically below the space between two hang-strips (11) of said third hang-rail for queuing (21), and the number of baffle grids (29) of the inlet section (22) is the same as that of the baffle grids (29) of the outlet section (23); no said hang-strips (11) are set on the outer side of said inlet section (22) and no said hang-strips (11) are set on the outer side of said outlet section (23);

wherein said second hang-rail (30) prepared for packaging stays tilted, said tail end (31) of the third hang-rail prepared for packaging is at the bottom of said third hang-rail (30) prepared for packaging, parallel to said inlet section (22) and converges with said inlet section (22)

into a sharing hang-rail section; the length of said sharing hang-rail section (32) is the same as that of inlet section (22) and no said hang-strips (11) are set on the inner side of said third hang-rail (30) prepared for packaging of said sharing hang-rail section (32);

wherein said front propeller (40) is on the outer side of said sharing hang-rail section (32), the length of said front pushing forward head (41) is the same as that of said inlet section (22) and said front pushing forward head (41) is below the inlet section (22), said front propeller (40) is on the side of said third hang-rail (30) and extends out said front pushing forward head (41);

wherein said inlet end (34) of the fourth hang-rail for storage and waiting connects vertically to said outlet section (23), said inlet end (34) of the hang-rail for storage and waiting is above said outlet end (35) of the fourth hang-rail for storage and waiting, the number of the hang-rails of said fourth hang-rail (33) for storage and waiting is the same as that of said baffle grids (29) at said outlet section (23), the width of one single rail of said fourth hang-rail (33) for storage and waiting is the same as the length of one single baffle grid (29), and the sum width of all rails of said inlet end (34) of the hang-rail for storage and waiting is the same as the length of outlet section (23); and wherein said back propeller (42) is on the inner side of said outlet section (23), the length of said back pushing forward head (43) of said back propeller (42) is the same as that of outlet section (23), said back pushing forward head (43) is below the outlet section (23), said back propeller (42) is on the side of said outlet section (23) and extends out said back pushing forward head (43) horizontally.

2. A hanging and parallel pushing lining-up device for a tubular material package according to claim 1, wherein the distance between adjacent baffle plates (28) is the same as that between said hang-strips of the first hang-rail (10).

3. A hanging and parallel pushing lining-up device for a tubular material package according to claim 1, wherein said synchronization belts (25) each time turns round said baffle grids (29), the number of which is the same as that of said baffle grids (29) at the inlet section (22), and the length of turning once is the same of that of said inlet section (22).

4. A hanging and parallel pushing lining-up device for a tubular material package according to claim 1, wherein said fourth hang-rail (33) for storage and waiting is in the shape of horn and the whole width of said inlet end (34) of the hang-rail for storage and waiting is smaller than that of said outlet end (35) of the fourth hang-rail for storage and waiting.

5. A hanging and parallel pushing lining-up device for a tubular material package according to claim 1, wherein said fourth hang-rail (33) is tilted and said inlet end (34) of the hang-rail for storage and waiting is above said outlet end (35) of the fourth hang-rail for storage and waiting (33).

* * * * *